BADGE HOLDER OF DETECTIVE GLASS FOR RADIATION DOSIMETRY

Filed Oct. 24, 1963

INVENTOR.
Ryosuke Yokota
BY Saburo Nakajima
George B. Oujevolk
attorney

United States Patent Office 3,293,433

Patented Dec. 20, 1966

3,293,433

BADGE HOLDER OF DETECTIVE GLASS FOR RADIATION DOSIMETRY

Ryosuke Yokota, Yokohama-shi, and Saburo Nakajima, Kawasaki-shi, Japan, assignors to Tokyo Shibaura Electric Co., Ltd., Kawasaki-shi, Japan Filed Oct. 24, 1963, Ser. No. 318,549
Claims priority, application Japan, Oct. 31, 1962, 37/64,943
1 Claim. (Cl. 250—83)

This invention relates to a badge holder for mounting a detective glass for measuring exposure dose of radiation on the breast of a person who may be exposed to radiation.

It is well known that when a special phosphate glass containing silver, for instance, a glass composition comprising 50 parts, by weight, of aluminum metaphosphate, 50 parts, by weight, of lithium metaphosphate, 7 parts, by weight, of silver metaphosphate and 3 parts, by weight, of boric anhydride, is exposed to such radiations as $\alpha$-, $\beta$-, $\gamma$- and X-rays and the like, numerous luminescence centers, the number thereof being proportional to the exposure dose, are created in the body of the glass. These luminescence centers are stable, so that they do not disappear even after the exposed glass has been stored over several months at room temperature. It is also well known that when subjected to ultraviolet ray irradiation having a wave length of about 365 m$\mu$, the exposed glass will produce an orange fluorescence, the intensity thereof being proportional to the number of the luminescence centers and hence to the initial radiation exposure dose. Therefore, the amount of radiation exposure dose can be determined by passing the fluorescence thus produced through a filter which can pass only light waves having wave length longer than 585 m$\mu$, and then measuring the amount of this fluorescence by means of a photomultiplier.

In carrying out such a measurement, contamination, if any, of the surface of a glass body will also produce fluorescence by the excitation of ultraviolet rays. Since such fluorescence contains light rays which transmit through a red or orange filter, the measured readings will be erroneous owing to the presence of such light rays. Therefore in order to measure precisely low dose ranging from 10 mr. to 1 r. it is essential to remove such contamination. However it is not always necessary to remove such contamination when measuring high dose, as for example, a dose exceeding 30 r. By the term contamination herein used to meant not only finger fat but also deposited dust, short fibers and the like.

Accordingly, it is essential to rinse the glass body of the dosimeter prior to measurement. Typical rinsing process includes washing with high grade acetone followed by washing with distilled water and finally with high grade alcohol. Alternatively, the glass body is washed with a synthetic detergent, then with water and finally with high grade methyl alcohol. In some cases ultrasonic washing may be added. Any of these washing procedures is very troublesome so dose measurement is not only very complex but also is of low efficiency.

It is therefore an object of this invention to preserve the surface of the glass body of the dosimeter in a clean state so as to eliminate cost and labor involved in washing contaminants deposited on the surface of said glass body and hence to enable the measurement to be effected simply, promptly and at high efficiency.

Another object of this invention is to eliminate dependency of the detective glass body upon the radiation energy and thus simplify measurement.

Briefly stated, the badge holder of a detective glass constructed according to the principle of this invention comprises an inner casing adapted to contain the glass body and made of tetrafluoro-ethylene chloride resin or trifluoro-ethylene chloride resin, an outer casing made of a conventional synthetic resin and a radiation filter made of a thin metal plate and sandwiched between said inner and outer casings. The glass body of the dosimeter can be moved in and out of the holder without touching the glass body. Thus the surface of the glass body remains uncontaminated, permitting repeated use thereof in successive measuring operations. The metal filter serves to eliminate or at least decrease the radiation energy dependency of this glass.

Further objects and advantages of the present invention will become apaprent and this invention will be better understood from the following description, reference being had to the accompanying drawing. The features of novelty which characterize the invention are set forth in the claims annexed and forming part of this specification.

Figure 1:
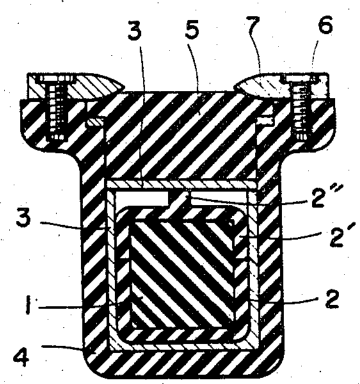
FIG. 1 is an enlarged longitudinal sectional view of a badge holder of this invention.

The construction of a badge holder constructed in accordance with the principle of this invention will be considered in detail by referring to FIG. 1. A long cube of special phosphate glass 1 having approximate dimensions of 8 mm. x 8 mm. x 4.7 mm. is shown as disposed in an inside casing 2 having a wall thickness of about 1.0 to 1.5 mm. and made of tetrafluoro- or trifluoro-ethylenechloride. The composition of this glass may be the same as that described above. The inside casing is composed of two sections, the cover section 2' and the bottom portion 2, the cover section 2' being provided with a knob 2''. The outer surface of these sections 2 and 2' of the inside casing is covered or surrounded by a thin tin plate 3 of 1.0 to 1.2 mm. thick. The glass body covered by two folds of casings in this way is contained in an outside casing 4 made of any conventional synthetic resin such as acrylic resin. It is advantageous to line the inner surface of the lid 5 of the outside casing with a tin plate, which together with said tin plate 3, completely encircles the inside casing 2. The lid 5 is secured to the body of the outside casing 4 by means of screws 6 through a rubber packing 7.

It was found that the outside casing does not affect the sensitivity of exposed dose on the glass body even when the casing is contaminated during its handling. However, as the inside casing is adapted to directly contact the glass body, it is necessary to thoroughly clean said inside casing prior to its use. Certain conventional synthetic resins are attacked by common detergent, for example, acetone or alcohol, but tetrafluoro- or trifluoro-ethylenechloride is not attacked by such detergents. Moreover, as the hardness of tetrafluoro- or trifluoro-ethylenechloride is smaller than that of the glass, it has no tendency to scratch the surface of the glass body. Moreover, since both inside and outside casings 2 and 4 are made of synthetic resins they transmit nearly all of the radiations. As a result the efficiency of measurement is never affected by these casings which surround the glass body. When extremely accurate measurement is required, the error in the result of measurement may be corrected by comparing results of standard irradiation test without using these casings as well as a metal filter to be described in the following.

Figure 2:
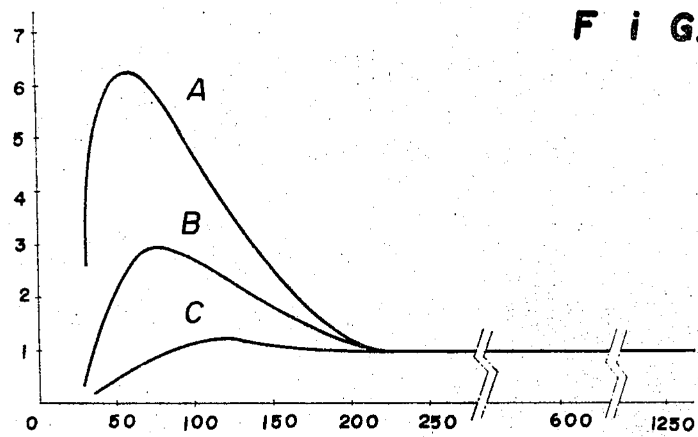
FIG. 2 shows curves of relative response of a detective glass under varied conditions utilized in the embodiment shown in FIG. 1.

The tin plate 3, which serves as a filter, is utilized for the purpose of amending the dependency of radiation energy of the glass body 1. When radiations such as X- rays or $\gamma$-rays are absorbed by a body of certain material, the mass absorption coefficient is different for different types of the material. The mass absorption coefficient is also different for X-rays or $\gamma$-rays having different energies. FIG. 2 shows a group of curves representing the relative response for various effective radiation energies. These curves are plotted by representing the effective energy kev. of X-rays or $\gamma$-rays on the abscissa, and the relative response for these radiation energies on the ordinate, it being understood that the relative response was determined by assuming that the mass absorption coefficient at 1250 kev. or of the $\gamma$-rays emerged from $Co^{60}$ is equal to unity. Curve A represents the relative response when using a glass body covered by acrylic resin sheet of 1.0 mm. thick, while curve C represents the relative response when using a tin plate filter of 1.0 mm. thick. By comparison of these two curves it will be clearly understood that the relative response becomes nearly constant for X-rays or $\gamma$-rays of the energy above 100 kev. when a tin filter is used. Thus the dependency of radiation energy of the glass body it not required to be taken into consideration in detecting and measuring the exposure dose for radiations above 100 kev. Thus, use of a tin filter greatly simplifies the measurements as well as calculations.

While the tin filter more or less affects the sensitivity of the glass body, as hereinabove pointed out this error can be eliminated by comparing the results of standard irradiation tests without using the tin filter.

Generally, X-rays frequently have energies lower than 100 kev. As can be seen from curve C shown in FIG. 2, below 100 kev. the energy dependency of the glass does not assume a constant value even when the tin filter is utilized. Similarly filters of any other metal can not make constant the relative response in this low energy region. Thus, in order to determine the exposure dose of these X-rays the following procedures are used wherein at first the effective energy expressed by kev. of X-rays is measured by utilizing a filter made of copper or brass, and then the relative response to said energy is acquired. The means may be outlined as follows.

Figure 3:
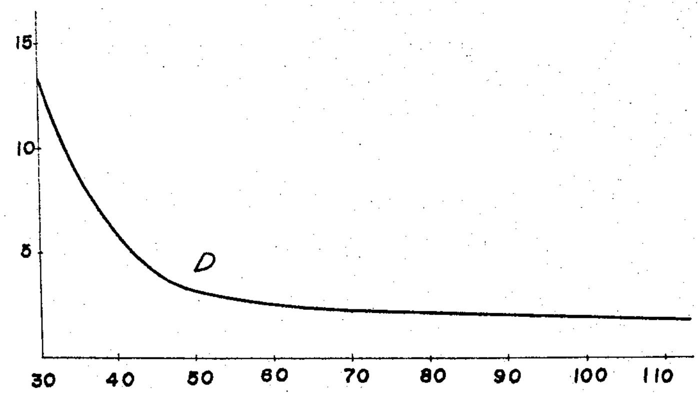
FIGURE 3 shows a curve utilizing data provided in FIGURE 2 to obtain a ratio curve of response.

Curves A and B of FIG. 1 respectively represent the relative response to radiation energies when using glass body only and a filter of brass or copper having thickness of 0.8 mm. with it. The curve D shown in FIG. 3 represents the ratio A/B in FIG. 2 by each kev.

In determining the exposure dose for X-rays ranging from 30 to 100 kev., the exposure dose is measured by using the detective glass covered by acrylic plate and then by using the detective glass with a brass or copper filter. Then the ratio of response is determined. The value of the effective energy of X-rays in kev. corresponding to said ratio is then determined by referring to the curve D shown in FIG. 4. By knowing this value it is possible to determine the response from the curve B in FIG. 2, so that the amount of radiation exposure is determined after correcting the fluorescence measurements.

It will be obvious to those skilled in the art that filters made of other metals can be used instead of brass or copper filter.

The badge case which has been subjected to a radiation exposure is removed from the breast of a person and then conveyed to a measuring room. The glass body will be taken out of the badge case and then inserted in a fluorimeter. Thus, for example, the badge case will be disposed in a box made of chromium plated brass and covered by a clear air curtain supplied through a high efficiency air filter, and after removing the lid 5 the upper part 2′ of inside casing will be removed by holding the knob 2″. Afterwards the detective glass 1 is removed by using a pincette and then inserted into a sample holder of a fluorimeter for measuring. After measurement the glass body will be returned to its original position in the badge case in the reverse order. Thus the glass body will be completely free from any contamination not only during use but also in measuring the dose.

When using the badge holder of this invention, since the metal filter employed greatly simplifies the measuring operation of the irradiated radiation dose, and moreover since it is not necessary to wash the glass body at each measurement, the efficiency of measurement can be greatly raised. Thus, the badge holder is advantageous particularly where a number of measurements are to be made in an extermely short time.

While the invention has been explained by describing a particular embodiment thereof, it will be apparent that improvements and modifications may be made without departing from the scope of the invention as defined in the appended claims.

What we claim is:

A badge holder of a detective glass body for radiation dosimetry, said badge holder comprising an inside casing having lower and upper sections, said upper section including a knob, said inside casing being of material selected from the group consisting of tetra and trifluoroethylenechloride resin and adapted to contain said glass body, an outside casing made of a conventional synthetic resin and a radiation filter made of tin utilized for radiations having energy above 100 kev. and material selected from brass and copper for radiations of 100 to 50 kev., said filter being sandwiched between said inside and outside casings.

References Cited by the Examiner

UNITED STATES PATENTS

| | | | |
|---|---|---|---|
| 2,624,846 | 1/1953 | Tochilin | 250—83 |
| 2,750,515 | 6/1956 | Shurcliff | 250—83 |
| 2,901,631 | 8/1959 | Hansen | 250—86 |
| 3,100,262 | 8/1963 | Shenker | 250—83 |

WALTER STOLWEIN, *Primary Examiner.*

JAMES W. LAWRENCE, RALPH G. NILSON, *Examiners.*

S. ELBAUM, *Assistant Examiner.*